June 22, 1937.　　　G. A. TINNERMAN　　　2,084,926
COMBINED FASTENING STRUCTURE

Original Filed May 8, 1936

INVENTOR.
GEORGE A. TINNERMAN
BY Bates, Goldrick & Teare
ATTORNEYS.

Patented June 22, 1937

2,084,926

UNITED STATES PATENT OFFICE 2,084,926

COMBINED FASTENING STRUCTURE

George A. Tinnerman, Rocky River, Ohio, assignor to Albert H. Tinnerman, Cleveland, Ohio Original application May 8, 1936, Serial No. 78,711. Divided and this application November 19, 1936, Serial No. 111,653

3 Claims. (Cl. 189—36)

This invention relates to devices for fastening together superposed parts, such as sheet metal members. Such members may be joined by threadless fasteners having portions thereof extruded therefrom and are adapted to engage the shank of a bolt or screw. Examples of such fasteners are shown (and claimed per se), in my copending application, Serial No. 78,711, filed May 8, 1936, of which the present application is a division, and since issued as Patent 2,062,685, December 1, 1936.

In using fasteners, in blind locations, that is, where an operator cannot readily hold a nut while he is inserting the bolt into it, it has been necessary to utilize some extraneous means, such as rivets or other fastening members, for holding the fasteners in place. There are many instances, however, particularly in automotive production where fasteners are desirable but where it is impractical to hold them in a satisfactory manner by any means heretofore employed. An example of such use is in the attachment of the fender to the body although there are many other examples which could be cited.

Figure 1:
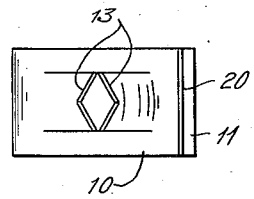
Figure 4:
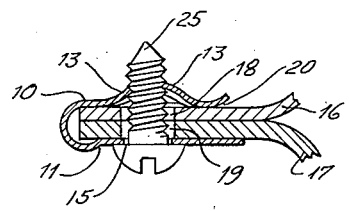
Figure 2:
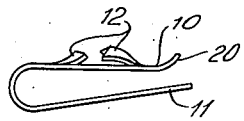
Figure 5:
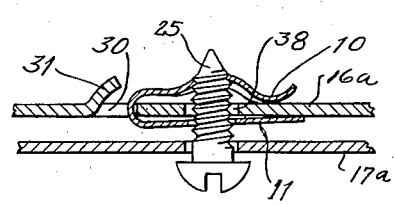
Figure 3:
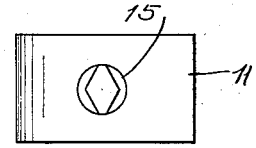
Figure 6:
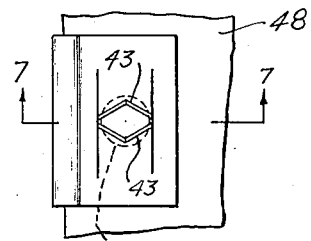
Figure 7:
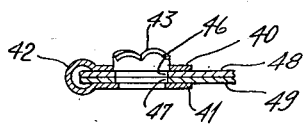

Referring to the drawing, Fig. 1 is a top plan view of a fastener which is made in accordance with the present invention; Fig. 2 is a side view of a fastener; Fig. 3 is a bottom view of the fastener; Fig. 4 is a section taken through the fastener when applied to the parts to be joined; Fig. 5 is a view illustrating the application of the fastener to one of the parts that are to be joined, particularly in a blind location; Fig. 6 is a top plan view of a fastener which is modified from that shown in Fig. 1 and Fig. 7 is a section taken on a plane as indicated by the line 7—7 in Fig. 6.

A fastener which is indicated by Figs. 1 to 5 preferably comprises a strip of sheet metal which is bent backwardly upon itself to provide two arms one of which is indicated at 10 and the other at 11. These arms may be substantially equal in width and may be spaced apart in accordance with the thickness of the part with which the fastener is intended for use. One of the arms may have a pair of tongues 12 formed integrally therewith and struck outwardly therefrom, and in the preferred arrangement, each tongue has a re-entrant recess 13, the two recesses cooperating to provide an opening for receiving the shank of the fastening member. In addition, that portion of each tongue adjacent the recess is inclined, with reference to the shank-receiving opening, to conform to the pitch of the thread of a bolt or screw with which it is intended for use.

The arm opposite that from which the tongues are struck has an opening 15 which is larger in diameter than the outside diameter of the shank of the fastening member, the intention being to provide clearance between the fastening member and the wall of the opening 15 and to utilize solely the tongues for fastening purposes. In the illustration of Fig. 4 the parts to be joined are indicated at 16 and 17 as having openings 18 and 19 respectively which are in registration.

The fastener has the opening 15 and the opening between the tongues 13 in registration with the openings 18 and 19. In addition, the space between the arms 10 and 11 is such that the fastener may be slid over the parts which previously have been placed together with the openings 18 and 19 in registration. To facilitate the entrance of the parts into the fastener, one of the arms may be flared outwardly as indicated at 20. As soon as the fastener is positioned in the proper place, then the bolt or screw 25 is moved in an endwise direction through all of the openings and is turned into locked position.

To use the fastener in blind locations, such as occur inwardly from the edge of a sheet, I prefer to form a slot in one of the parts to be fastened, near the opening thereof through which the bolt is adapted to pass. This, as illustrated in Fig. 5 at 30, is formed by striking part of the metal of the part 16a upwardly as at 31. The slot is sufficiently close to the opening 38 in the part 16a that when the fastener is moved endwise through the slot and onto the part, the tongues are in position to engage the bolt that is passed through the openings 38 and 39 in the parts 16a and 17a respectively. In this form of connection the arm 10 of the fastener engages one side of one of the parts to be fastened, while the arm 11 engages the opposite side of the same part. The part 17a then has its inner surface engaging the outer surface of the arm 11, so that part of the fastener is thus interposed between the two parts to be joined together. If desired, slots, such as 30, may be made in each of the parts to be joined, so as to enable the arms of the fastener to embrace the outer surfaces of both parts.

In Figs. 6 and 7, I have shown a modification in which the fastener comprises two substantially parallel portions or arms 40 and 41 that are connected by a looped portion 42. The arm 40 has tongues 43 projecting upwardly and in opposing relation, while the arm 41 has an opening 44 in alignment with the bolt receiving openings that are formed by the tongues, and also in alignment with the openings 46 and 47 in the parts 48 and 49 respectively. In this modification, the tongues extend in the same direction as the line of bend, whereas in Fig. 1 the tongues extend transversely of the line of bend between the arms. This latter arrangement is satisfactory in those locations where space limitations prevent the use of a spring fastener which has arms of such length as are necessary to provide the tongue formation illustrated in Fig. 1. While I have shown the thread engaging portion as comprising yieldable tongues, I may, if desired use other forms as come within the scope of the appended claims.

A fastener having arms of substantially equal length assures a flat bearing surface against one of the parts to be joined, while the curved portion provides a connection which prevents the fastener from turning with reference to such parts during the bolt inserting operation. Moreover, the fastener is advantageous in that it is admirably suited for making connections in blind locations.

I claim:

1. In securing parts not accessible from both sides, the combination of a support readily accessible from one side only and provided with a bolt passage and an assembling slot, a part to be connected to said support and a one-piece connecting device comprising a pair of members one of which is provided with bolt receiving means deformed therefrom and is applicable through the assembling slot from the accessible side of the support to be positioned on the opposite side thereof with the bolt receiving means overlying the bolt passage and in position to receive a bolt fastening to connect said part to the support.

2. In securing parts not accessible from both sides, the combination of a support readily accessible from one side only and provided with a bolt passage and an assembling slot, a part to be connected to said support and a one-piece connecting device comprising a plurality of integral members one of which is provided with integral bolt receiving means deformed therefrom and is applicable through the assembling slot from the accessible side of the support to be positioned on the opposite side thereof with the bolt receiving means overlying the bolt passage to receive a bolt fastening to connect said part to the support, said member provided with the bolt receiving means being of such size as to completely cover the bolt passage to prevent the bolt receiving means from being pulled therethrough when the bolt fastening is drawn up.

3. In securing parts not accessible from both sides, the combination of a support readily accessible from one side only and provided with a bolt passage and an assembling slot, a part to be connected to said support and a one-piece sheet metal connecting device comprising a pair of members one of which is provided with integral bolt receiving means deformed therefrom and is applicable through the assembling slot from the accessible side of the support to be positioned on the opposite side thereof to cooperate with the other of said members to maintain the device in position on the support with the bolt receiving means overlying the bolt passage for receiving a bolt fastening to connect said part to the support, said bolt passage in the support being completely covered by the member provided with the bolt receiving means to prevent the same from being pulled through the bolt passage when the bolt fastening is drawn up.

GEORGE A. TINNERMAN.